(12) United States Patent
Inoue et al.

(10) Patent No.: US 12,025,631 B2
(45) Date of Patent: Jul. 2, 2024

(54) AUTOMATIC SAMPLE INTRODUCTION DEVICE, CHROMATOGRAPH, AUTOMATIC SAMPLE INTRODUCTION METHOD AND ANALYSIS METHOD

(71) Applicant: SHIMADZU CORPORATION, Kyoto (JP)

(72) Inventors: Takashi Inoue, Kyoto (JP); Makoto Ogaito, Kyoto (JP)

(73) Assignee: SHIMADZU CORPORATION, Kyoto (JP)

( * ) Notice: Subject to any disclaimer, the term of this patent is extended or adjusted under 35 U.S.C. 154(b) by 707 days.

(21) Appl. No.: 17/059,859

(22) PCT Filed: May 28, 2018

(86) PCT No.: PCT/JP2018/020411
§ 371 (c)(1),
(2) Date: Nov. 30, 2020

(87) PCT Pub. No.: WO2019/229819
PCT Pub. Date: Dec. 5, 2019

(65) Prior Publication Data
US 2021/0215732 A1 Jul. 15, 2021

(51) Int. Cl.
*G01N 35/10* (2006.01)
*B01D 15/14* (2006.01)
(Continued)

(52) U.S. Cl.
CPC ......... *G01N 35/1095* (2013.01); *B01D 15/14* (2013.01); *B01F 33/30* (2022.01);
(Continued)

(58) Field of Classification Search
CPC .... G01N 35/1095; G01N 30/06; G01N 30/18; G01N 30/24; G01N 2030/067; B01F 2101/23; B01F 33/30; B01D 15/14
See application file for complete search history.

(56) References Cited

U.S. PATENT DOCUMENTS

| | | | |
|---|---|---|---|
| 2006/0196282 | A1 | 9/2006 | Tatsumi et al. |
| 2011/0056985 | A1 | 3/2011 | Bublewitz et al. |

(Continued)

FOREIGN PATENT DOCUMENTS

| | | |
|---|---|---|
| JP | 63-071650 A | 4/1988 |
| JP | 3-74357 U | 7/1991 |

(Continued)

OTHER PUBLICATIONS

Espacenet English machine translation of JP2008290038A. (Year: 2008).*

(Continued)

*Primary Examiner* — Jennifer Wecker
*Assistant Examiner* — Kathryn Elizabeth Limbaugh
(74) *Attorney, Agent, or Firm* — Sughrue Mion, PLLC

(57) ABSTRACT

An automatic sample introduction device includes a needle, a sample loop, a mixer and a suction injection switch mechanism. The mixer is provided between the needle and the sample loop. The suction injection switch mechanism sequentially sucks first and second fluids into the sample loop through the needle and the mixer and injects the first and second fluids held in the sample loop into a predetermined injection port. A chromatograph includes the automatic sample introduction device having the above-mentioned configuration, an analysis column and a detector. The analysis column is connected to the injection port of the automatic sample introduction device, and the detector is connected to the analysis column.

9 Claims, 4 Drawing Sheets

(51) Int. Cl.
  *B01F 33/30* (2022.01)
  *B01F 101/23* (2022.01)
  *G01N 30/06* (2006.01)
  *G01N 30/18* (2006.01)
  *G01N 30/24* (2006.01)

(52) U.S. Cl.
  CPC .......... *G01N 30/06* (2013.01); *G01N 30/18* (2013.01); *G01N 30/24* (2013.01); *B01F 2101/23* (2022.01); *G01N 2030/067* (2013.01)

(56) References Cited

U.S. PATENT DOCUMENTS

| 2011/0114668 | A1 | 5/2011 | Bublewitz et al. |
| 2011/0290042 | A1* | 12/2011 | Maeda ................... G01N 30/16 73/864.21 |
| 2012/0127821 | A1* | 5/2012 | Dunfee ................... B01F 31/44 366/142 |

FOREIGN PATENT DOCUMENTS

| JP | 2006-242720 A | 9/2006 | |
| JP | 2008-256540 A | 10/2008 | |
| JP | 2008290038 A | * 12/2008 | ......... B01F 13/0059 |
| JP | 2010-538827 A | 12/2010 | |
| JP | 2013-66863 A | 4/2013 | |

OTHER PUBLICATIONS

International Search Report for PCT/JP2018/020411 dated Aug. 21, 2018 [PCT/ISA/210].
Written Opinion for PCT/JP2018/020411 dated Aug. 21, 2018 [PCT/ISA/237].
Communication dated Oct. 26, 2021 from the Japanese Patent Office in Application No. 2020-521668.
Office Action issued Oct. 26, 2022 in Chinese Application No. 201880093959.0.

* cited by examiner

AUTOMATIC SAMPLE INTRODUCTION DEVICE, CHROMATOGRAPH, AUTOMATIC SAMPLE INTRODUCTION METHOD AND ANALYSIS METHOD

CROSS REFERENCE TO RELATED APPLICATIONS

This application is a National Stage of International Application No. PCT/JP2018/020411 filed May 28.

TECHNICAL FIELD

The present invention relates to an automatic sample introduction device, a chromatograph including the automatic sample introduction device, an automatic sample introduction method and a chromatographic method using the automatic sample introduction method.

BACKGROUND ART

For example, an automatic sample introduction device that automatically injects a sample into a sample injection port (injection port) of a liquid chromatograph is used. The automatic sample introduction device is referred to as a sample injection device or an autosampler. In Patent Document 1, a total volume injection type automatic sample introduction device is described.

[Patent Document 1] JP 2006-242720 A

SUMMARY OF INVENTION

Technical Problem

A sample, a diluting solvent, a derivatizing reagent and the like are sucked into a sample loop by the automatic sample introduction device. The sample, the diluting agent, the derivatizing reagent and the like in the sample loop are injected into an injection port of a liquid chromatograph. In this case, when the sample, the diluting agent, the derivatizing reagent and the like are not mixed sufficiently, reproducibility of a result of analysis is lowered, or the sample is derivatized insufficiently.

In the automatic sample introduction device described in Patent Document 1, a sample bottle storing the sample (hereinafter referred to as a first bottle), a sample bottle storing the reagent (hereinafter referred to as a second bottle) and an empty sample bottle (hereinafter referred to as a third bottle) are prepared. The sample in the first bottle is sucked into the sample loop through a needle, and then the sucked sample is injected into the third bottle. Thereafter, the reagent in the second bottle is sucked into the sample loop through the needle, and then the sucked reagent is discharged to the third bottle. Thus, the sample and the reagent are mixed in the third bottle. The mixture of the sample and the reagent in the third bottle is sucked into the sample loop through the needle. The needle is moved to a position above an injection port, and the mixture of the sample and the reagent in the sample loop is injected into the injection port through the needle.

With the above-mentioned method, the step of mixing the sample and the reagent using the empty third bottle is required, so that it takes time to mix the plurality of fluids and inject the mixture into the injection port.

An object of the present invention is to provide an automatic sample introduction device, a chromatograph, an automatic sample introduction method and a chromatographic method that enable sufficient mixing of a plurality of fluids and injection of a mixture into an injection port in a few steps.

Solution to Problem

An automatic sample introduction device according to one aspect of the present invention includes a needle, a sample loop, a mixer provided between the needle and the sample loop and a suction injection switch mechanism that sequentially sucks first and second fluids into the sample loop through the needle and the mixer and injects the first and second fluids held in the sample loop into a predetermined injection port through the mixer and the needle.

In the automatic sample introduction device, the first fluid is sucked into the sample loop through the needle and the mixer. In this case, part of the first fluid remains in the mixer. Next, the second fluid is sucked into the sample loop through the needle and the mixer. At this time, the second fluid is mixed with the first fluid remaining in the mixer when passing through the mixer. Therefore, the mixture of the first and second fluids is held in the sample loop. Thereafter, the first and second fluids in the sample loop are injected in the injection port through the mixer and the needle. At this time, the first and second fluids are mixed sufficiently in the mixer again. Therefore, the step of mixing the first fluid and the second fluid in advance is not required. As a result, the plurality of fluids can be mixed sufficiently and injected into the injection port in a few steps.

The needle may have a tip to be inserted into the first and second fluids and a base end portion that communicates with the sample loop, the mixer may be provided at the base end portion of the needle, the automatic sample introduction device may further include a movement mechanism that moves the mixer together with the needle, and the movement mechanism may move the needle together with the mixer such that the tip of the needle is inserted into the first fluid, may move the needle together with the mixer such that the tip of the needle is inserted into the second fluid and may move the needle together with the mixer such that the tip of the needle is positioned in the injection port.

In this case, because the mixer moves together with the needle, it is not necessary to provide a flow path between the needle and the mixer, or the flow path between the needle and the mixer can be shortened. Therefore, an amount of the second fluid that does not pass through the mixer and remains in the needle and the flow path after suction of the second fluid can be reduced.

The mixer may include a microreactor, the microreactor may include a first port, a second port and a find tubular flow path that causes the first port and the second port to communicate with each other and the fine tubular flow path may be configured to branch at a plurality of locations and join at a plurality of locations. In this case, the size of the mixer can be reduced, and the first and second fluids can be mixed sufficiently in the mixer.

One of the first and second fluids may include a sample, and another one of the first and second fluids may include a reaction liquid. In this case, the sample and the reaction liquid can be mixed sufficiently when being sucked and injected.

A chromatograph according to another aspect of the present invention includes the above-mentioned automatic sample introduction device, an analysis column connected to the injection port and a detector that detects components of the first and second fluids that have passed through the analysis column.

In the chromatograph, the plurality of fluids can be mixed sufficiently and injected into the injection port by the automatic sample introduction device in a few steps. Therefore, reproducibility of the result of chromatography is improved.

An automatic sample introduction method according to yet another aspect of the present invention includes the steps of sucking a first fluid into a sample loop through a needle and a mixer, mixing the first fluid and a second fluid by sucking the second fluid into the sample loop through the needle and the mixer and injecting the first and second fluids held in the sample loop into a predetermined injection port through the mixer and the needle.

With the automatic sample introduction method, the first and second fluids pass through the mixer when being sucked and injected. As a result, the plurality of fluids can be mixed sufficiently and injected into the injection port in a few steps.

The needle may have a tip to be inserted into the first and second fluids and a base end portion that communicates with the sample loop, and the mixer may be provided at the base end portion of the needle and the automatic sample introduction method may further include the steps of moving the needle together with the mixer by the movement mechanism such that the tip of the needle is inserted into the first fluid before the first fluid is sucked, moving the needle together with the mixer by the movement mechanism such that the tip of the needle is inserted into the second fluid before the second fluid is sucked and moving the needle together with the mixer by the movement mechanism such that the tip of the needle is positioned in the injection port before the first and second fluids are injected into the injection port.

In this case, the amount of the second fluid that does not pass through the mixer and remains in the needle and the flow path can be reduced.

The mixer may include a microreactor, the microreactor may include a first port, a second port and a fine tubular flow path that causes the first port and the second port to communicate with each other and the fine tubular flow path may be configured to branch at a plurality of locations and join at a plurality of locations, the step of sucking the first fluid may include sucking the first fluid into the sample loop through the needle, the first port, the fine tubular flow path and the second port, the step of sucking the second fluid may include sucking the second fluid into the sample loop through the needle, the first port, the fine tubular flow path and the second port and the step of injecting the first and second fluids into the injection port may include injecting the first and second fluids held in the sample loop into the injection port through the second port, the fine tubular flow path, the first port and the needle.

In this case, the size of the mixer can be reduced, and the first and second fluids can be mixed sufficiently in the mixer.

A chromatographic method according to yet another aspect of the present invention includes the steps of performing the above-mentioned automatic sample introduction method, guiding the first and second fluids injected into the injection port to an analysis column and detecting components of the first and second fluids that have passed through the analysis column by a detector.

With this analysis method, the plurality of fluids can be mixed sufficiently and injected into the injection port in a few steps. Therefore, reproducibility of the result of chromatography is improved.

Advantageous Effects of Invention

The present invention enables a plurality of fluids to be mixed sufficiently and injected into an injection port in a few steps.

DESCRIPTION OF EMBODIMENTS

An automatic sample introduction device, a chromatograph including the automatic sample introduction device, an automatic sample introduction method and an analysis method using the automatic sample introduction method according to embodiments of the present invention will be described below in detail with reference to the drawings.

(1) Configuration of Chromatograph

Figure 1:
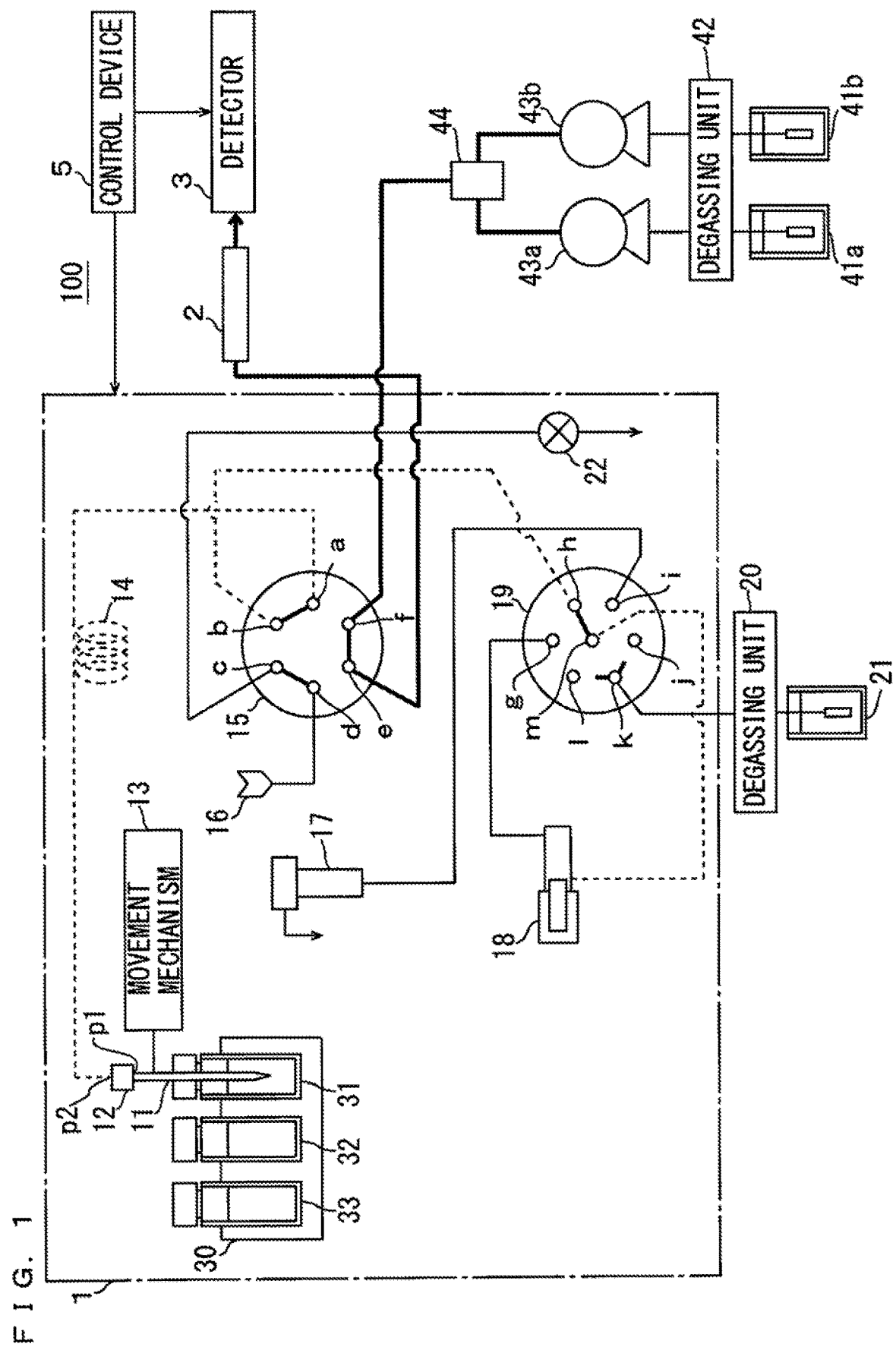
FIG. 1 is a schematic diagram showing the configuration and a sample sucking operation of a chromatograph according to one embodiment of the present invention.
Figure 2:
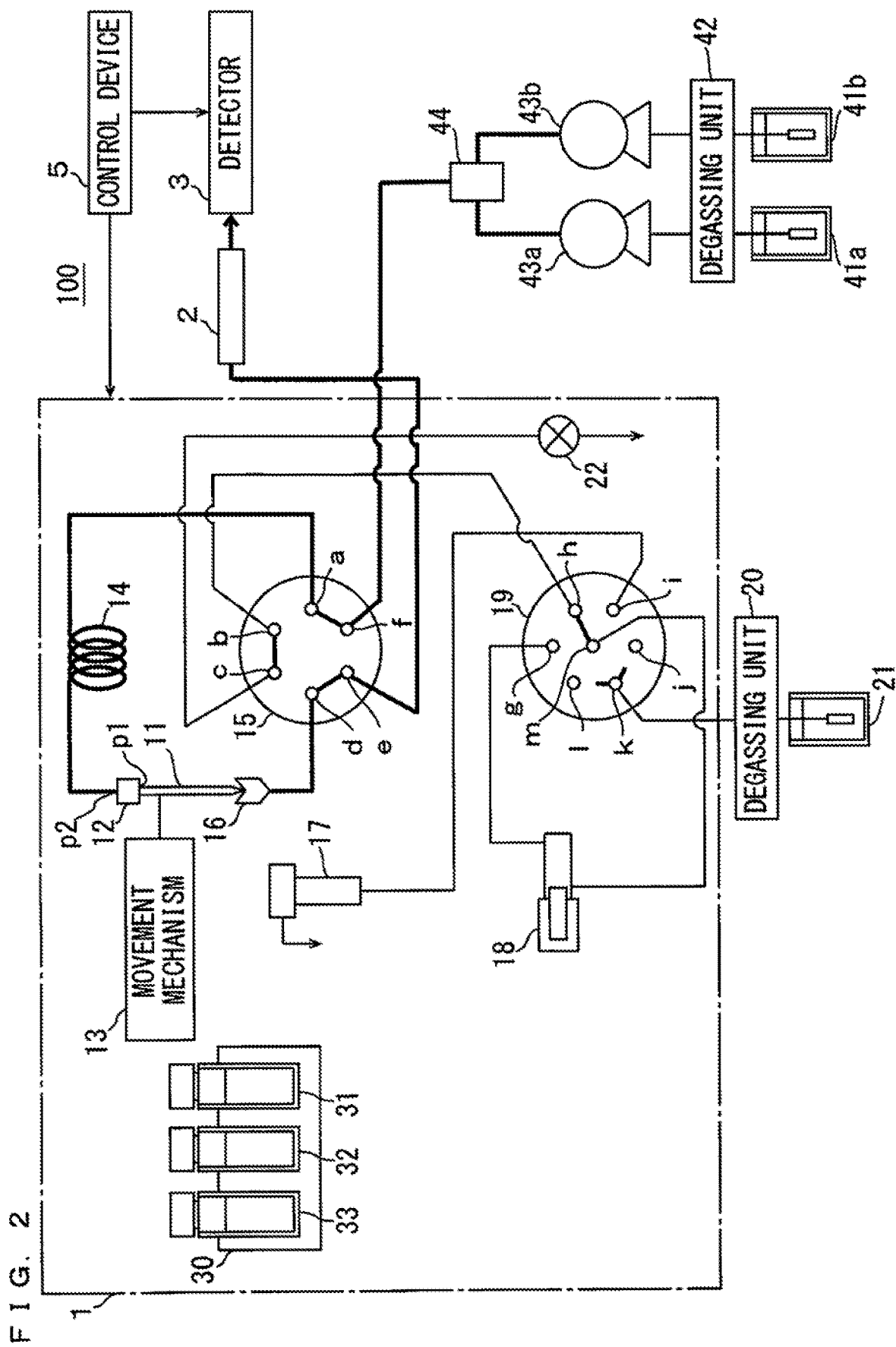
FIG. 2 is a schematic diagram showing the sample injecting operation in the chromatograph of FIG. 1.

FIG. 1 is a schematic diagram showing the configuration and a sample sucking operation of the chromatograph according to one embodiment of the present invention. FIG. 2 is a schematic diagram showing a sample injecting operation in the chromatograph of FIG. 1.

The chromatograph 100 of FIG. 1 is a liquid chromatograph and includes the automatic sample introduction device 1, an analysis column 2, a detector 3, a degassing unit 20, a cleaning liquid bottle 21, mobile phase storage tanks 41a, 41b, a degassing unit 42, liquid sending pumps 43a, 43b, a mixer 44 and a control device 5. The automatic sample introduction device 1 includes a needle 11, a mixer 12, a movement mechanism 13 and a sample loop 14. Further, the automatic sample introduction device 1 includes a high-pressure valve 15, an injection port 16, a cleaning port 17, a metering pump 18 and a low-pressure valve 19.

A plurality of sample containers 31, 32, 33 are placed on a sample rack 30. In the present embodiment, a liquid sample (real sample) is stored in the sample container 31, a reaction liquid such as a derivatizing reagent is stored in the sample container 32 and a buffer solution for dilution, an organic solvent for dilution or the like is stored in the sample container 33. In a case where the sample includes an amino acid, for example, OPA (o-phthalaldehyde), for example, is used as the derivatizing reagent. In the present embodiment, the sample corresponds to a first fluid, and the reaction liquid corresponds to a second fluid. The plurality of sample containers 31, 32, 33 are vials, for example.

The small-sized mixer 12 is attached to the base end portion (upper end) of the needle 11. The needle 11 is provided to be movable in a horizontal direction and a vertical direction together with the mixer 12 by the movement mechanism 13. The mixer 12 is a low-capacity micromixer constituted by a microreactor, for example.

The mixer 12 has a first port p1 and a second port p2. A plurality of fine tubular flow paths are formed between the first port p1 and the second port p2. The plurality of fine tubular flow paths are configured to branch at a plurality of locations and join at a plurality of locations. The first port p1 of the mixer 12 communicates with the needle 11, and the second port p2 communicates with the sample loop 14.

The high-pressure valve 15 is a rotary valve having a plurality of ports 'a' to 'f.' This high-pressure valve 15 is switched between a load state and an injection state. In the load state, as indicated by the thick solid lines in FIG. 1, the ports 'a,' 'b' communicate with each other, the ports 'c,' 'd' communicate with each other and the ports 'e,' 'f' communicate with each other. In the injection state, as indicated by the thick solid lines in FIG. 2, the ports 'b,' 'c' communicate with each other, the ports 'd,' 'e' communicate with each other and the ports 'f,' 'a' communicate with each other.

The other end of the sample loop 14 is connected to the port 'a' of the high-pressure valve 15. The injection port 16 is connected to the port 'd' of the high-pressure valve 15. The port 'c' of the high-pressure valve 15 is connected to a drain valve 22.

The low-pressure valve 19 is a rotary valve having ports 'g' to 'm.' The port 'b' of the high-pressure valve 15 is connected to the port 'h' of the low-pressure valve 19. The cleaning port 17 is connected to the port 'i' of the low-pressure valve 19.

The metering pump 18 is a syringe pump having two suction-discharge ports, for example. One suction-discharge port of the metering pump 18 is connected to the port 'g' of the low-pressure valve 19. The other suction-discharge port of the metering pump 18 is connected to the port 'm' of the low-pressure valve 19. The cleaning liquid bottle 21 is connected to the port 'k' of the low-pressure valve 19 through the degassing unit 20.

Different types of mobile phase solvents are respectively stored in the mobile phase storage tanks 41a, 41b. The mixer 44 has two input ports and one output port. The mobile phase storage tanks 41a, 41b are respectively connected to the one and the other input ports of the mixer 44 through the degassing unit 42 and the liquid sending pumps 43a, 43b. The output port of the mixer 44 is connected to the port 'f' of the high-pressure valve 15.

The port 'e' of the high-pressure valve 15 is connected to the analysis column 2, and the detector 3 is connected to the analysis column 2. The detector 3 detects components of the sample supplied to the analysis column 2. The control device 5 is a computer that includes a CPU (Central Processing Unit), a RAM (Random Access Memory), a ROM (Read Only Memory), a storage device and so on. This control device 5 controls the operations of the movement mechanism 13 and the metering pump 18, and the switch of the high-pressure valve 15 and the low-pressure valve 19 of the automatic sample introduction device 1, and the operation of the detector 3. In the present embodiment, the high-pressure valve 15, the metering pump 18, the low-pressure valve 19, the liquid sending pumps 43a, 43b and the control device 5 constitute a suction injection switch mechanism.

(2) Operation of Automatic Sample Introduction Device

Figure 3:
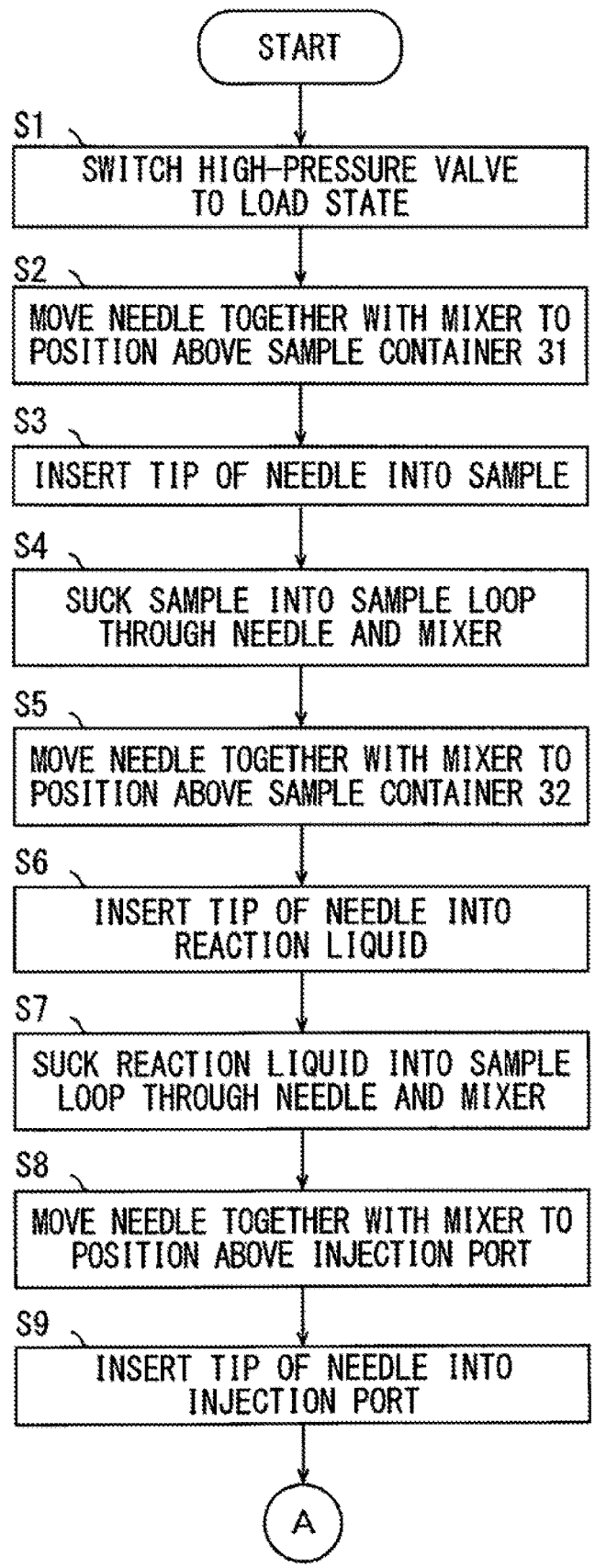
FIG. 3 is a flowchart mainly showing the operation of an automatic sample introduction device of FIGS. 1 and 2.
Figure 4:
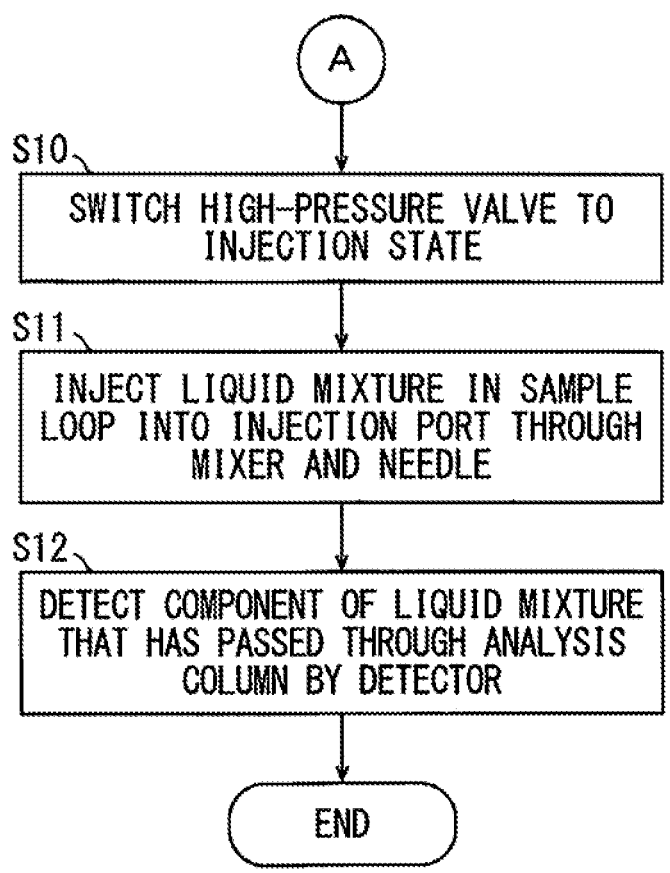
FIG. 4 is a flowchart mainly showing the operation of the automatic sample introduction device of FIGS. 1 and 2.

FIGS. 3 and 4 are flowcharts mainly showing the operation of the automatic sample introduction device 1 of FIGS. 1 and 2. Next, the operation of the automatic sample introduction device 1 will be mainly described with reference to FIG. 3.

First, as shown in FIG. 1, the control device 5 switches the high-pressure valve 15 to the load state (step S1). Thus, the ports 'a,' 'b' communicate with each other, the ports 'c,' 'd' communicate with each other and the ports 'e,' 'f' communicate with each other. The port 'm' of the low-pressure valve 19 communicates with the port 'h.'

The two types of mobile phase solvents in the mobile phase storage tanks 41a, 41b are supplied to both of the input ports of the mixer 44 by the liquid sending pumps 43a, 43b through the degassing unit 42 as indicated by the thick solid lines. The mobile phase solvents mixed in the mixer 44 are supplied to the analysis column 2 through the port 'f' and the port 'e' of the high-pressure valve 15 as indicated by the thick solid line.

The movement mechanism 13 moves the needle 11 together with the mixer 12 to a position above the sample container 31 (step S2) and then inserts the tip of the needle 11 into the sample in the sample container 31 by lowering the needle 11. In this state, the metering pump 18 performs a sucking operation through the path indicated by the dotted line in FIG. 1. Specifically, the metering pump 18 sucks the sample in the sample container 31 into the sample loop 14 through the needle 11 and the mixer 12 (step S4). Thus, the sample is held in the sample loop 14. At this time, part of the sample remains in the fine tubular flow paths in the mixer 12.

Next, the movement mechanism 13 moves the needle 11 together with the mixer 12 to a position above the sample container 32 (step S5) and then inserts the tip of the needle 11 into the reaction liquid in the sample container 32 by lowering the needle 11. In this state, the metering pump 18 sucks the reaction liquid in the sample container 32 into the sample loop 14 through the needle 11 and the mixer 12 (step S7). At this time, the reaction liquid is mixed with the sample remaining in the fine tubular flow paths when passing through the mixer 12. Therefore, a liquid mixture of the sample and the reaction liquid is held in the sample loop 14.

Next, the movement mechanism 13 moves the needle 11 together with the mixer 12 to a position above the injection port 16 (step S8) and then inserts the tip of the needle 11 into the injection port 16 by lowering the needle 11 (step S9).

Thereafter, as shown in FIG. 2, the control device 5 switches the high-pressure valve 15 to the injection state (step S10). Thus, the ports 'b,' 'c' communicate with each other, the ports 'd,' 'e' communicate with each other and the ports 'f,' 'a' communicate with each other. The liquid sending pumps 43a, 43b supply a liquid mixture of the two types of mobile phase solvents derived from the mixer 44 to the sample loop 14 through the port 'f' and the port 'a' of the high-pressure valve 15. Thus, the liquid sending pumps 43a, 43b inject the liquid mixture of the sample and the reaction liquid held in the sample loop 14 into the injection port 16 from the tip of the needle 11 through the mixer 12 (step S11). At this time, the liquid mixture of the sample and the reaction liquid passes through the fine tubular flow paths in the mixer 12, whereby the sample and the reaction liquid are mixed sufficiently.

The liquid mixture injected into the injection port 16 is supplied to the analysis column 2. The detector 3 detects components of the liquid mixture that has passed through the analysis column 2 (step S12). In this manner, the sample is analyzed by the liquid chromatography.

Part of the reaction liquid sucked in the above-mentioned step S7 does not pass through the mixer 12 and remains in the needle 11. Although the reaction liquid remaining in the needle 11 is not mixed with the sample, because the reaction liquid mixed with the sample sufficiently is present in the sample loop 14, the analysis to be performed in the analysis column 2 is not interfered.

After the above-mentioned step S7, the buffer solution, the organic solvent or the like for dilution in the sample container 33 may be sucked by the needle 11. Specifically, the movement mechanism 13 moves the needle 11 together with the mixer 12 to a position above the sample container 33 and then inserts the tip of the needle 11 into the buffer solution, the organic solvent or the like in the sample container 33 by lowering the needle 11. In this state, until the reaction liquid remaining in the needle 11 passes through the mixer 12, the metering pump 18 sucks the buffer solution, the organic solvent or the like in the sample container 33 through the needle 11. Thus, the reaction liquid that is not mixed with the sample is prevented from remaining in the needle 11.

Further, after the suction of the sample in the step S4 and the suction of the reaction liquid in the step S7, the outer peripheral surface of the needle 11 may be cleaned by insertion of the needle 11 into the cleaning port 17. A cleaning liquid is stored in the cleaning port 17 in advance. When the cleaning liquid is supplied from the cleaning liquid bottle 21 to the cleaning port 17, the low-pressure valve 19 is switched such that the port 'm' communicates with the port 'k' of the low-pressure valve 19. The metering pump 18 sucks the cleaning liquid in the cleaning liquid bottle 21 through the degassing unit 20. Thereafter, the low-pressure valve 19 is switched such that the port 'm' communicates with the port T of the low-pressure valve 19. The metering pump 18 supplies the sucked cleaning liquid to the cleaning port 17 through the port 'm' and the port 'i.'

(3) Effects of Embodiments

With the automatic sample introduction device 1 and the automatic sample introduction method according to the present embodiment, the sample and the reaction liquid pass through the mixer 12 when being sucked sequentially by the needle 11. Thus, the sample and the reaction liquid are mixed in the mixer 12, and the liquid mixture of the sample and the reaction liquid is held in the sample loop 14. The liquid mixture of the sample and the reaction liquid passes through the mixer 12 when being injected into the injection port 16. Thus, the sample and the reaction liquid are mixed sufficiently again in the mixer 12. Therefore, the step of mixing the sample and the reaction liquid in advance is not required. As a result, the sample and the reaction liquid can be mixed sufficiently and injected into the injection port 16 in a few steps.

Further, in the present embodiment, because the mixer 12 is attached to the base end portion of the needle 11, a flow path that connects the needle 11 to the mixer 12 is not required. Therefore, the amount of the reaction liquid that does not pass through the mixer 12 and remains in the needle 11 and the flow path after the suction of the reaction liquid can be reduced.

Further, in the present embodiment, because the mixer 12 is constituted by the microreactor, the size of the mixer 12 can be reduced, and the sample and the reaction liquid can be mixed sufficiently by the small-sized mixer 12. Further, because the mixer 12 can be moved easily together with the needle 11, the size of the movement mechanism 13 is not increased, and the configuration of the movement mechanism 13 is not complicated. Therefore, the size of the automatic sample introduction device 1 is prevented from being increased.

As a result, with the chromatograph 100 and the chromatographic method according to the present embodiment, reproducibility of a result of analysis is improved. Further, in a case where the reaction liquid is a derivatizing reagent, a derivatization rate is improved.

(4) Other Embodiments

While the mixer 12 is attached to the needle 11 in the above-mentioned embodiment, the needle 11 and the mixer 12 may be connected to each other by a flow path such as a pipe. With such a configuration, part of the reaction liquid does not pass through the mixer and remains in the needle 11 and the flow path. In this case, it is possible for the reaction liquid remaining in the needle 11 and the flow path to pass through the mixer 12 by sucking the buffer solution or the like after the suction of the reaction liquid.

While the mixer 12 is constituted by the microreactor in the above-mentioned embodiment, the mixer 12 may have another constitution.

While the first and second fluids are the sample and the reaction liquid in the above-mentioned embodiment, the first and second fluids may be two types of samples.

Further, at least one of the first and second fluids may be gas. Further, while two types of fluids are mixed in the above-mentioned embodiment, three or more types of fluids may be mixed.

While the mixer 12 is moved together with the needle 11 in the above-mentioned embodiment, the mixer 12 may be fixed and only the needle 11 may be moved.

While the sample is sucked into the sample loop 14 and then the reaction liquid is sucked into the sample loop 14 in the above-mentioned embodiment, the reaction liquid may be sucked into the sample loop 14 and then the sample may be sucked into the sample loop 14.

While the automatic sample introduction device 1 according to the above-mentioned embodiment is applied to the liquid chromatograph, the automatic sample introduction device 1 may be applied to a gas chromatograph.

The invention claimed is:

1. An automatic sample introduction device comprising:
   a needle;
   a sample loop;
   a mixer provided between the needle and the sample loop; and
   a suction injection switch mechanism that sequentially sucks first and second fluids into the sample loop through the needle and the mixer and injects the first and second fluids held in the sample loop into a predetermined injection port through the mixer and the needle,
   wherein the mixer comprises a fine tubular flow path, the mixer being configured to:
      allow some of the first fluid to remain in the fine tubular flow path when the first fluid is sucked into the sample loop; and
      mix the second fluid with the first fluid remaining in the fine tubular flow path when the second fluid is sucked into the sample loop.

2. The automatic sample introduction device according to claim 1, wherein
   the needle has a tip to be inserted into the first and second fluids and a base end portion that communicates with the sample loop, and
   the mixer is provided at the base end portion of the needle and is configured to be moved together with the needle.

3. The automatic sample introduction device according to claim 1, wherein
   the mixer includes a microreactor, the microreactor includes a first port, a second port and the fine tubular flow path that causes the first port and the second port to communicate with each other and the fine tubular flow path is configured to branch at a plurality of locations and join at a plurality of locations.

4. The automatic sample introduction device according to claim 1, wherein
one of the first and second fluids includes a sample, and another one of the first and second fluids includes a reaction liquid.

5. A chromatograph comprising:
the automatic sample introduction device according to claim 1,
an analysis column connected to the injection port; and
a detector that detects components of the first and second fluids that have passed through the analysis column.

6. An automatic sample introduction method including the steps of:
sucking a first fluid into a sample loop through a needle and a mixer;
mixing the first fluid and a second fluid by sucking the second fluid into the sample loop through the needle and the mixer; and
injecting the first and second fluids held in the sample loop into a predetermined injection port through the mixer and the needle,
wherein the mixer comprises a fine tubular flow path, the mixer being configured to:
allow some of the first fluid to remain in the fine tubular flow path when the first fluid is sucked into the sample loop; and
mix the second fluid with the first fluid remaining in the fine tubular flow path when the second fluid is sucked into the sample loop.

7. The automatic sample introduction method according to claim 6, wherein
the needle has a tip to be inserted into the first and second fluids and a base end portion that communicates with the sample loop, and the mixer is provided at the base end portion of the needle, and
the automatic sample introduction method further includes the steps of:
moving the needle together with the mixer such that the tip of the needle is inserted into the first fluid before the first fluid is sucked;
moving the needle together with the mixer such that the tip of the needle is inserted into the second fluid before the second fluid is sucked, and
moving the needle together with the mixer such that the tip of the needle is positioned in the injection port before the first and second fluids are injected into the injection port.

8. The automatic sample introduction method according to claim 6, wherein
the mixer includes a microreactor, the microreactor includes a first port, a second port and the fine tubular flow path that causes the first port and the second port to communicate with each other and the fine tubular flow path is configured to branch at a plurality of locations and join at a plurality of locations,
the step of sucking the first fluid includes sucking the first fluid into the sample loop through the needle, the first port, the fine tubular flow path and the second port,
the step of sucking the second fluid includes sucking the second fluid into the sample loop through the needle, the first port, the fine tubular flow path and the second port, and
the step of injecting the first and second fluids into the injection port includes injecting the first and second fluids held in the sample loop into the injection port through the second port, the fine tubular flow path, the first port and the needle.

9. A chromatographic method including the steps of:
performing the automatic sample introduction method according to claim 6,
guiding the first and second fluids injected into the injection port to an analysis column; and
detecting components of the first and second fluids that have passed through the analysis column by a detector.

* * * * *